(12) United States Patent
Lee et al.

(10) Patent No.: US 8,782,524 B2
(45) Date of Patent: Jul. 15, 2014

(54) METHOD AND APPARATUS FOR CONTROLLING PRESENTATION SLIDES

(75) Inventors: Gene-Moo Lee, Seongnam-si (KR); Shin-Il Kang, Suwon-si (KR); Jin-Wook Lee, Yongin-si (KR); Je-Hyok Ryu, Suwon-si (KR); Hun Lim, Gyeonggi-do (KR); Woo-Jin Park, Yongin-si (KR); Jin-Hyoung Kim, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 909 days.

(21) Appl. No.: 12/751,323

(22) Filed: Mar. 31, 2010

(65) Prior Publication Data

US 2010/0251122 A1 Sep. 30, 2010

(30) Foreign Application Priority Data

Mar. 31, 2009 (KR) .................. 10-2009-0027625
Dec. 11, 2009 (KR) .................. 10-2009-0123536

(51) Int. Cl.
*G06F 3/00* (2006.01)

(52) U.S. Cl.
USPC ........... 715/730; 715/738; 715/740; 715/741; 715/748; 715/753

(58) Field of Classification Search
CPC ...................... H04M 1/72533; G06F 17/30056
See application file for complete search history.

(56) References Cited

U.S. PATENT DOCUMENTS

| 6,968,506 | B2 * | 11/2005 | Yacovone et al. ............. 715/730 |
| 7,783,702 | B2 * | 8/2010 | Liu et al. ....................... 709/204 |
| 2002/0109712 | A1 * | 8/2002 | Yacovone et al. ............. 345/732 |
| 2003/0048291 | A1 * | 3/2003 | Dieberger ..................... 345/732 |
| 2003/0182621 | A1 * | 9/2003 | Mazza et al. .................. 715/504 |
| 2004/0098456 | A1 * | 5/2004 | Krzyzanowski et al. ..... 709/204 |
| 2005/0039129 | A1 * | 2/2005 | Paul .............................. 715/730 |
| 2007/0162858 | A1 * | 7/2007 | Hurley et al. ................. 715/732 |
| 2008/0168355 | A1 * | 7/2008 | Dunlap et al. ................ 715/733 |
| 2008/0183811 | A1 * | 7/2008 | Kotras et al. .................. 709/203 |
| 2008/0252856 | A1 * | 10/2008 | Hsiao ............................. 353/40 |
| 2010/0037151 | A1 * | 2/2010 | Ackerman et al. ............ 715/753 |
| 2010/0114985 | A1 * | 5/2010 | Chaudhary et al. ........... 707/803 |
| 2010/0114991 | A1 * | 5/2010 | Chaudhary et al. ........... 707/809 |
| 2010/0146496 | A1 * | 6/2010 | Stoddart et al. ............... 717/168 |

FOREIGN PATENT DOCUMENTS

| KR | 1020020074362 | 9/2002 |
| KR | 1020060004050 | 1/2006 |
| KR | 1020060087008 | 8/2006 |
| KR | 1020070020970 | 2/2007 |

\* cited by examiner

*Primary Examiner* — Stephen Alvesteffer
(74) *Attorney, Agent, or Firm* — The Farrell Law Firm, P.C.

(57) ABSTRACT

A presentation control system and method are provided, in which a first terminal is connected to a second terminal to control displaying of a presentation file stored in the second terminal. The first terminal controls execution of the presentation file in the second terminal, controls execution of switching between slide pages included in the presentation file in the second terminal, and controls closing of the presentation file in the second terminal.

12 Claims, 8 Drawing Sheets

METHOD AND APPARATUS FOR CONTROLLING PRESENTATION SLIDES

PRIORITY

This application claims priority under 35 U.S.C. §119(a) to Korean Patent Applications filed in the Korean Intellectual Property Office on Mar. 31, 2009 and Dec. 11, 2009, which are assigned Serial Nos. 10-2009-0027625 and 10-2009-0123536, respectively, the entire disclosures of both of which are hereby incorporated by reference.

BACKGROUND OF THE INVENTION

1. Field of the Invention

The present invention relates generally to a method for controlling presentation slides, and more particularly, to a method and apparatus for controlling presentation slides using a mobile terminal.

2. Description of the Related Art

With increased functionality of mobile terminals, users now can enjoy applications with their mobile terminals that previously were only available in a desktop Personal Computer (PC). In addition, by taking advantage of the mobility of mobile terminals, many new applications have been developed.

Along with the development of the performance and associated functions of mobile terminals, collaboration and convergence services with existing PCs are becoming more common, raising a demand for related applications.

SUMMARY OF THE INVENTION

The present invention has been designed to provide at least the advantages as will be described below. Accordingly, an aspect of the present invention is to provide a method and apparatus for controlling a presentation file, which is executed in a PC, using a mobile terminal.

In accordance with an aspect of the present invention, there is provided a method for controlling presentation slides, in which a first terminal is connected to a second terminal to control displaying of at least one slide page included in a presentation file stored in the second terminal. The first terminal controls execution of the presentation file in the second terminal, controls execution of switching the least one slide page included in the presentation file in the second terminal, and controls closing of the presentation file in the second terminal.

In accordance with another aspect of the present invention, there is provided a first terminal for controlling an operation of a second terminal connected to the first terminal by wireless communication, in which a phone agent manages a connection with the second terminal, manages sharing of a presentation file with the second terminal, manages opening and closing of a presentation file stored in the second terminal, and manages switching of at least one slide page included in the presentation file. A user interface delivers an input from an exterior to the phone agent.

In accordance with another aspect of the present invention, there is provided a second terminal connected to a first terminal by wireless communication, in which a Personal Computer (PC) agent manages a connection with the first terminal, manages sharing of a presentation file with the first terminal, checks a control right of the first terminal, manages opening and closing of a presentation file received from the first terminal, and manages switching of at least one slide page included in the presentation file. A user interface delivers an input from an exterior to the PC agent.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EMBODIMENTS OF THE INVENTION

Various embodiments of the present invention will be described in detail herein below with reference to the accompanying drawings. Further, in the following description, detailed descriptions of known functions and components incorporated herein will be omitted when they may obscure the subject matter of the present invention.

Figure 1:
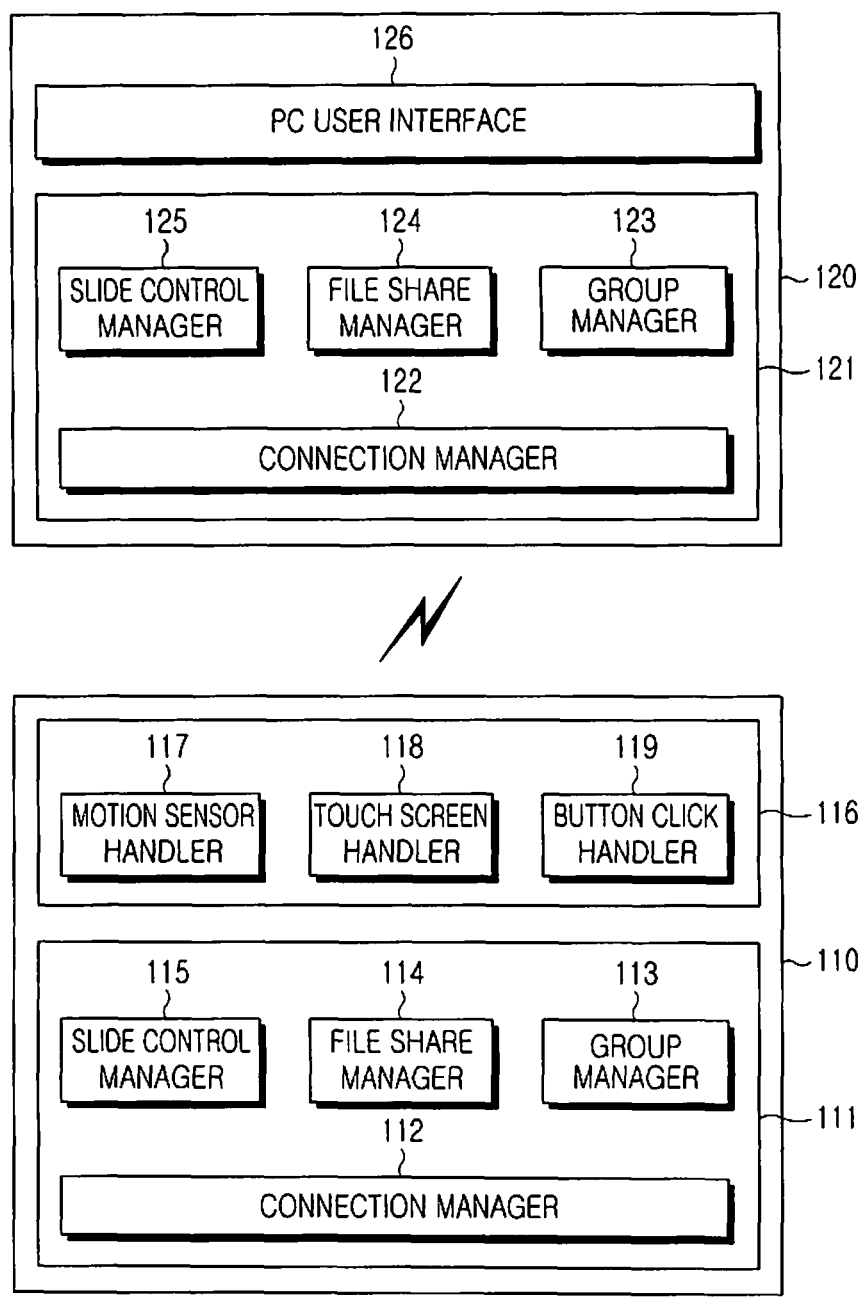
FIG. 1 is a schematic diagram illustrating a system according to an embodiment of the present invention is applied.

FIG. 1 schematically illustrates a system capable of operating a presentation control method according to an embodiment of the present invention.

Referring to FIG. 1, the system includes a Personal Computer (PC) 120 and a mobile terminal 110, such as a cellular phone, Personal Digital Assistant, etc. The system enables a user conducting a presentation to control execution of a presentation file stored in the PC 120, which is often located in a remote place, and to switch between slide pages included in the presentation file, using the mobile terminal 110. For example, the PC 120 and the mobile terminal 110 may be connected to each other by short-range wireless communications such as Bluetooth, ZigBee, and Personal Area Network (PAN).

Although the exemplary embodiments of the present invention have disclosed that the PC 120 and the mobile terminal 110 may be connected by short-range wireless communication such as Bluetooth, ZigBee, and PAN, the scope of the present invention should not be limited thereto. For example, the PC 120 and the mobile terminal 110 may be connected by longer-range wireless communication or Internet.

For example, the PC 120 may be connected to multiple mobile terminals 110 during the presentation, and the execution of the presentation, e.g., opening/closing of a presentation file and the switching of slide pages included in the presentation file, may controlled by at least one of the mobile terminals 110 connected to the PC 120, based on the set control rights. A mobile terminal 110, which is granted a control right of the presentation, may control opening/closing of the presentation file and switching a presentation slide, while a mobile terminal 110, which is given a read right to merely read the execution state of the presentation file, will merely synchronize a presentation slide page being displayed in the PC 120 and display the synchronized slide page on the mobile terminal 110.

As illustrated in FIG. 1, each of the PC 120 and the mobile terminal 110 includes a software block for applying and implementing a presentation control method according to an embodiment of the present invention. More specifically, the mobile terminal 110 includes a phone agent 111 for managing a connection with the PC 120 and processing commands received from the CP 120, and the PC 120 includes a PC agent 121 for managing a connection with the mobile terminal 110 and processing commands received from the mobile terminal 110. Additionally, the mobile terminal 110 includes a phone user interface 116 for processing commands provided from the phone agent 111 and from a user of the mobile terminal 110, and the PC 120 includes a PC user interface 126 for processing commands provided from the PC agent 121 and from a user of the PC 120.

In the mobile terminal 110, the phone agent 111 includes a connection manager 112, a group manager 113, a file share manager 114, and a slide control manager 115.

The connection manager 112 manages a connection of the mobile terminal 110 with the PC 120. Specifically, when a user of the mobile terminal 110 wants to connect with the PC 120, the connection manager 112 generates a message for requesting a check of a connection state and sends the message to the PC 120. Additionally, when the user of the mobile terminal 110 wants to disconnect from the PC 120, the connection manager 112 generates a message requesting a disconnection and sends the message to the PC 120.

The group manager 113 manages joining and leaving of the mobile terminals 110 to and from a group to which a presentation is being provided. Specifically, upon receiving a command to request group joining from a user through the phone user interface 116, the group manager 113 generates a group join request message for requesting group joining and sends the group join request message to the PC 120. Similarly, upon receiving a group leave request from the user of the mobile terminal 110 through the phone user interface 116, the group manager 113 generates a group leave request message and sends it to the PC 120.

The PC 120 may be connected to multiple mobile terminals 110 during the presentation, and the execution of the presentation, e.g., opening/closing of a presentation file and the switching of slide pages included in the presentation file, may controlled by at least one of the mobile terminals 110 connected to the PC 120, based on a set right type having a control right of the presentation and the read right to merely read the execution state of the presentation file. A mobile terminal 110, which is granted the control right of the presentation, may control opening/closing of the presentation file and switching a presentation slide, while a mobile terminal 110, which is given the read right to merely read the execution state of the presentation file, will merely synchronize a presentation slide page being displayed in the PC 120 and display the synchronized slide page on the mobile terminal 110.

In order to implement these features, the mobile terminal 110 may set the right type of the mobile terminal 110 and send the right type included in the group join request message to the PC 120, by help of the group manager 113. Specifically, when receiving the command to request group joining from the user, the group manager 113 may also receive the right type of the mobile terminal 110 from the user of the mobile terminal. For example, the right type may be any selected one of the control right and the read right. Also, the group manager 113 generates the group join request message including a command that requests group joining with the right type.

The file share manager 114 manages the sharing of a presentation file stored in the mobile terminal 110 or the PC 120. As indicated above, a presentation control method according to an embodiment of the present invention controls a presentation file executed in the PC 120 under control of the mobile terminal 110. Initially, the presentation file may be stored in the PC 120 or in the mobile terminal 110. Therefore, the file share manager 114 may upload the presentation file stored in the mobile terminal 110 to the PC 120, or download the presentation file stored in the PC 120 into the mobile terminal 110.

More specifically, the file share manager 114 receives an upload request for a presentation file from a user of the mobile terminal 110 through the phone user interface 116. In response to the request, the file share manager 114 sends an upload request message for the presentation file to the PC 120 and receives control right check information, which is obtained by checking a control right of the mobile terminal 110, from the PC 120. If the control right check information indicates that the mobile terminal 110 is permitted to upload, the file share manager 114 uploads the presentation file to the PC 120.

The file share manager 114 may also receive a download request for a presentation file from a user of the mobile terminal 110 through the phone user interface 116. In response to the request, the file share manager 114 sends a download request message for the presentation file to the PC 120 and receives control right check information, which is obtained by checking a control right of the mobile terminal 110, from the PC 120. If the control right check information indicates an approval for downloading the presentation file, the file share manager 114 notifies the PC 120 when it is ready to download a file, and then downloads the presentation file from the PC 120.

The slide control manager 115 controls opening/closing of a presentation file, and switching between slide pages included in the presentation file.

More specifically, upon receiving a request to start a slideshow for a presentation file from the user through the phone user interface 116, the slide control manager 115 sends a presentation execute request message to the PC 120. The presentation execute request message includes identification information of the mobile terminal 110, information indicating the presentation file to be executed, and information indicating opening of the presentation file.

Similarly, upon receiving a request to stop a slideshow for a presentation file from a user through the phone user interface 116, the slide control manager 115 sends a presentation stop request message to the PC 120. The presentation stop request message includes identification information of the mobile terminal 110, information indicating the presentation file to be closed, and information indicating closing of the presentation file.

Upon receiving a request from the user through the phone user interface 116 to switch between slide pages included in a presentation file, the slide control manager 115 controls the switching of the slide page. That is, the slide control manager 115 sends a slide switch request message to the PC 120, upon receiving a switch request to switch to a previous or a next slide page from a current slide page. The slide switch request message includes identification information of the mobile terminal 110, information indicating a presentation file including the slides to be switched, and information indicating switching of the slide page.

In addition, upon receiving a new slide page that the user directly inputs through the phone user interface 116 and to which the user desires to switch, the slide control manager 115 may send a slide switch request message along with the new slide page input by the user.

As described above, the mobile terminal 110 includes a phone user interface 116 for processing commands provided from the phone agent 111. The phone user interface 116 provides a user with an interface for requesting opening/closing of a presentation file, switching between slide pages, uploading/downloading of a presentation file, group joining, group leaving, etc. For example, the phone user interface 116 illustrated in FIG. 1 includes a motion sensor handler 117 for sensing inputs based on movement of the mobile terminal 110, a touch screen handler 118 for sensing inputs received through a touch screen of the mobile terminal 110, and a button click handler 119 for sensing inputs received through the pressing a button or keys on a keypad of the mobile terminal 110.

The phone user interface 116 may request switching of slide pages, using a touch-slide input, a key button input, a motion sensor input, etc. Accordingly, the motion sensor handler 117 for detecting a direction of the mobile terminal 110 that the user moves, using a motion sensor, and for requesting switching of a slide page based on the detected direction. The touch screen handler 118 that is arranged together with a display of the mobile terminal 110, and detects an input of touch screen input on the display and requests switching of the slide page based on the detected input, e.g., detects a sliding direction and requests switching of the slide page based on the detected sliding direction. The button click handler 119 requests switching of slide pages based on an input of a key button provided on the mobile terminal 110.

As described above, the PC 120 includes a PC agent 121 for managing a connection with the mobile terminal 110 and processing commands received from the mobile terminal 110. For example, the PC agent 121 illustrated in FIG. 1 includes a connection manager 122, a group manager 123, a file share manager 124, and a slide control manager 125.

The connection manager 122, manages and maintains a connection with the mobile terminal 110. More specifically, upon receiving a request message for checking a connection state from the connection manager 112 in the mobile terminal 110, the connection manager 122 generates a response message or ACK to the request message, sends the response message to the connection manager 112 in the mobile terminal 110, and then checks and holds the connection state with the connection manager 112 in the mobile terminal 110. Upon receiving a message requesting disconnection from the connection manager 112 in the mobile terminal 110, the connection manager 122 generates a response message to the request message, sends the response message to the connection manager 112 in the mobile terminal 110, and then disconnects from the mobile terminal 110.

The group manager 123 controls group joining and leaving, as requested by a group manager 113 in the mobile terminal 110. More specifically, upon receiving a group join request message from the mobile terminal 110, the group manager 123 provides the group join request from the mobile terminal 110 to a user through the PC user interface 126. The group manager 123 receives an approval/denial of the group join request from the user, and provides the received result to the mobile terminal 110. The group join request message may include the right type. When the group join request of the mobile terminal 110 is allowed, the group manager 123 may store the right type and use the right type to determine a control right to control opening/closing of the presentation file, switching a presentation slide, and uploading/downloading of the presentation file.

Additionally, in accordance with another embodiment of the present invention, the connection manager may include a list of mobile terminals 110 that are authorized to join a group, and therefore, can allow or deny a mobile terminal 110 that has sent a group join request message, without first receiving approval from the user of the PC 120.

Similarly, upon receiving a group leave request message from the mobile terminal 110, the group manager 123 provides the group leave request from the mobile terminal 110 to the user on the PC user interface 126. Then the group manager 123 receives an approval/denial of the group leave request from the user, and provides the received result to the mobile terminal 110. Alternatively, the group manager 123 may just approve the request for disconnection of the mobile terminal 110, without first receiving approval from the user of the PC 120.

The file share manager 124 uploads a presentation file stored in the mobile terminal 110 to the PC 120 or downloads a presentation file stored in the PC 120 to the mobile terminal 110 in cooperation with the file share manager 114 in the mobile terminal 110. More specifically, upon receiving an upload request message from the file share manager 114 in the mobile terminal 110, the file share manager 124 connects with the group manager 123 and checks a control right of the mobile terminal 110. If the mobile terminal 110 has a control right, the file share manager 124 approves uploading of the presentation file, and transmits information indicating an approval of file uploading to the file share manager 114 in the mobile terminal 110. Subsequently, the file share manager 124 proceeds with file uploading in cooperation with the file share manager 114 in the mobile terminal 110. After completion of the file uploading, the file share manager 124 transmits information indicating the completed file uploading to the file share manager 114 in the mobile terminal 110.

However, if the mobile terminal 110 has no control right, the file share manager 124 denies uploading of the presentation file, instead of approving uploading of the presentation file.

Upon receiving a download request message from the file share manager 114 in the mobile terminal 110, the file share manager 124 connects with the group manager 123 and checks a control right of the mobile terminal 110. If the mobile terminal 110 has a control right, the file share manager 124 approves downloading of the presentation file, and transmits information indicating an approval of file downloading to the file share manager 114 in the mobile terminal 110. Subsequently, the file share manager 124 receives information indicating that the mobile terminal 110 is ready to download a file, from the file share manager 114 in the mobile terminal 110, and then proceeds with file downloading. However, if the mobile terminal 110 has no control right, the file share manager 124 denies downloading of the presentation file, instead of approving downloading of the presentation file.

Upon receiving a presentation execute request message from the slide control manager 115 in the mobile terminal 110, the slide control manager 125 checks a control right of the mobile terminal 110 and the presence of the presentation file, executes the presentation file on the PC user interface 126, and displays an initial slide page included in the presentation file to a screen of the PC 120. Thereafter, the slide control manager 125 sends a response message with information indicating the completed execution of the presentation file to the slide control manager 115 in the mobile terminal 110.

Upon receiving a slide switch request message from the slide control manager 115 in the mobile terminal 110, the slide control manager 125 checks a control right of the mobile terminal 110 and the presence of the switch-requested slide page and then switches the slide page on the PC user interface 126. Thereafter, the slide control manager 125 sends a response message with information indicating the completed switching of the slide page to the slide control manager 115 in the mobile terminal 110.

Upon receiving a presentation stop request message from the slide control manager 115 in the mobile terminal 110, the slide control manager 125 checks a control right of the mobile terminal 110 and the presence of the presentation file to be closed, and then stops the execution of the presentation file on the PC user interface 126. Thereafter, the slide control manager 125 sends a response message with information indicating the completed closing of the presentation file to the slide control manager 115 in the mobile terminal 110.

Operations of the mobile terminal 110 and the PC 120 will be described in more detail below with reference to a process of implementing the presentation control method according to various embodiments of the present invention.

1. Connection and Data Initialization Between Mobile Terminal 110 and PC 120

Figure 2:
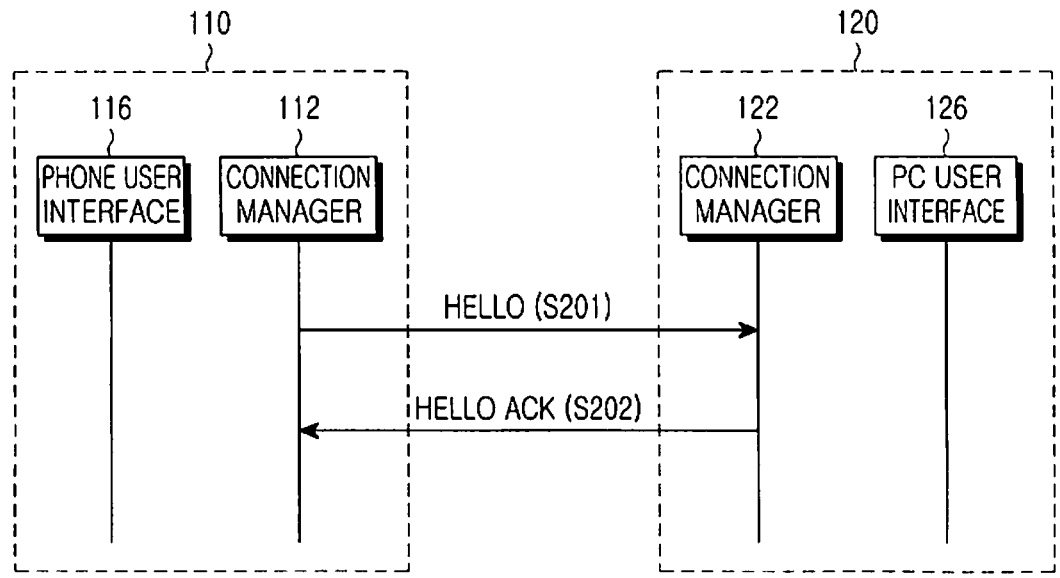
FIG. 2 is a flow diagram illustrating a connection and data initialization process between a mobile terminal and a PC according to an embodiment of the present invention.

FIG. 2 illustrates a connection and data initialization process between a mobile terminal and a PC utilizing a presentation control method according to an embodiment of the present invention.

Referring to FIG. 2, in step S201, to establish a connection between a mobile terminal 110 and a PC 120, a connection manager 112 in the mobile terminal 110 sends a "Hello" message to a connection manager 122 in the PC 120. The "Hello" message includes an identifier of the mobile terminal 110 and information indicating a request to check a connection state. Upon receiving the "Hello" message, the connection manager 122 in the PC 120 checks the connection state, generates a "Hello ACK" with the connection state, and sends the "Hello ACK" to the connection manager 112 in the mobile terminal 110 in step S202.

2. Disconnecting a Mobile Terminal 110 and a PC 120

Figure 3:
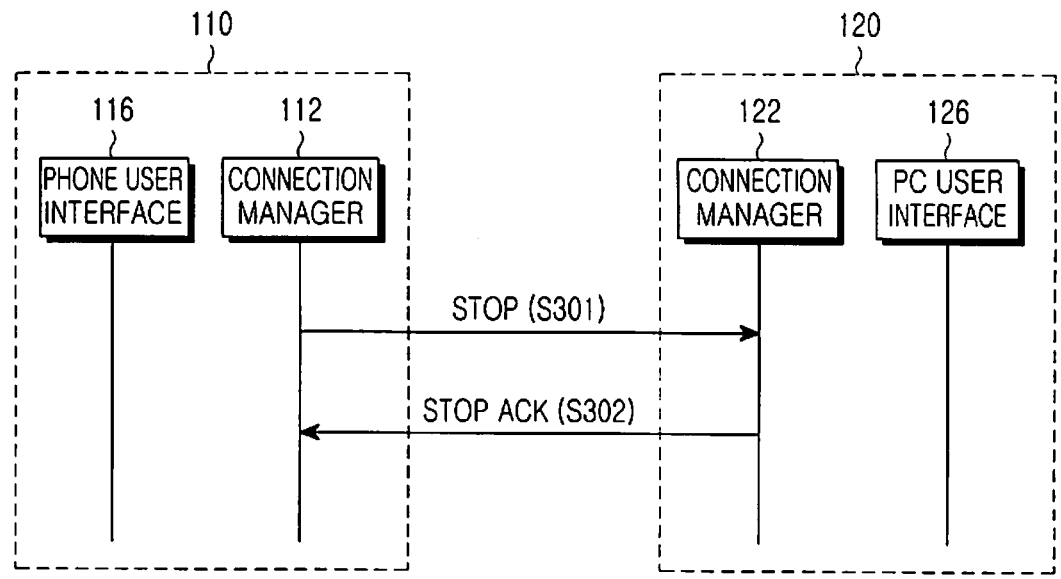
FIG. 3 is a flow diagram illustrating a disconnection process between a mobile terminal and a PC according to an embodiment of the present invention.

FIG. 3 illustrates a disconnection process between a mobile terminal 110 and a PC 120 utilizing a presentation control method according to an embodiment of the present invention.

Referring to FIG. 3, to disconnect an established connection with the PC 120, a connection manager 112 in the mobile terminal 110 sends a "Stop" message to a connection manager 122 in the PC 120 in step S301. The "Stop" message includes an identifier of the mobile terminal 110 and information indicating a disconnection request. Upon receiving the "Stop" message, the connection manager 122 in the PC 120 generates a "Stop ACK", and sends it to the connection manager 112 in the mobile terminal 110 in step S302. Thereafter, the connection manager 122 in the PC 120 disconnects from the connection manager 112 in the mobile terminal 110.

3. Group Joining

Figure 4:
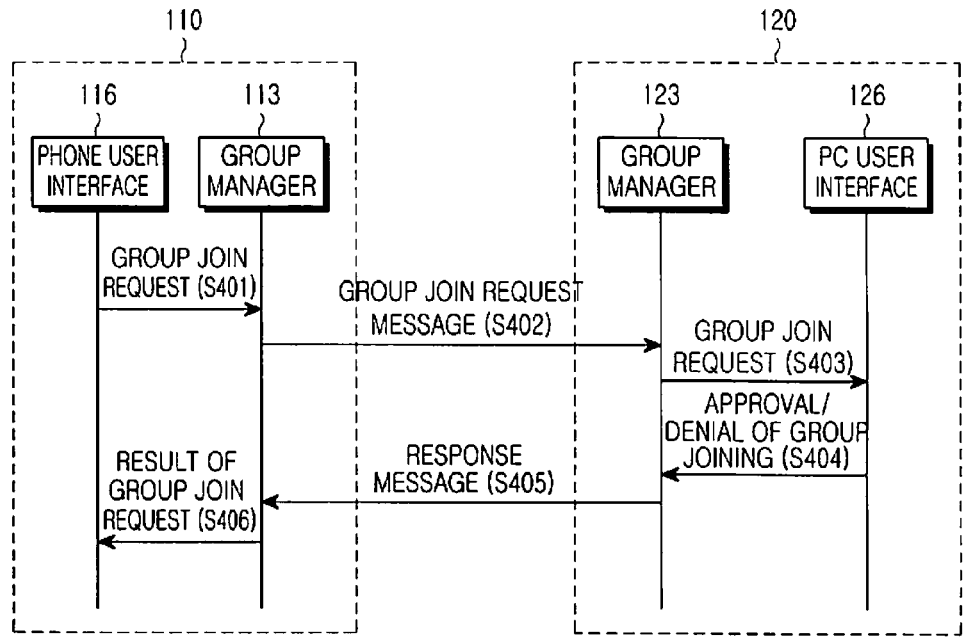
FIG. 4 is a flow diagram illustrating a group joining of a mobile terminal in a presentation control method according to an embodiment of the present invention.

FIG. 4 illustrates joining of a mobile terminal to group utilizing a presentation control method according to an embodiment of the present invention.

Referring to FIG. 4, upon receiving a group join request from a user, a phone user interface 116 in a mobile terminal 110 sends a group join request command to a group manager 113 in step S401. The group manager 113 generates a group join request message including an identifier and a right type (e.g., a control right or a read right) of the mobile terminal 110, and information indicating the group join request, and sends the group join request message to a group manager 123 in the PC 120 in step S402.

Upon receiving the group join request message, the group manager 123 in the PC 120 checks the information indicating the group join request, and sends the group join request of the mobile terminal 110 to a PC user interface 126 in step S403. The PC user interface 126 receives an approval/denial of the group joining from a user, and provides the received result to the group manager 123 in step S404.

The group manager 123 stores the result provided from the PC user interface 126 and the right type included in the group join request message, and sends a response message including the approval/denial of group joining of the mobile terminal 110 to the group manager 113 in the mobile terminal 110 in step S405.

Upon receiving the response message, the group manager 113 provides a result of the group join request, i.e., approval/denial of group joining, to the phone user interface 116 in step S406. Thereafter, the phone user interface 116 provides the result of the group join request to the user.

4. Group Leaving

Figure 5:
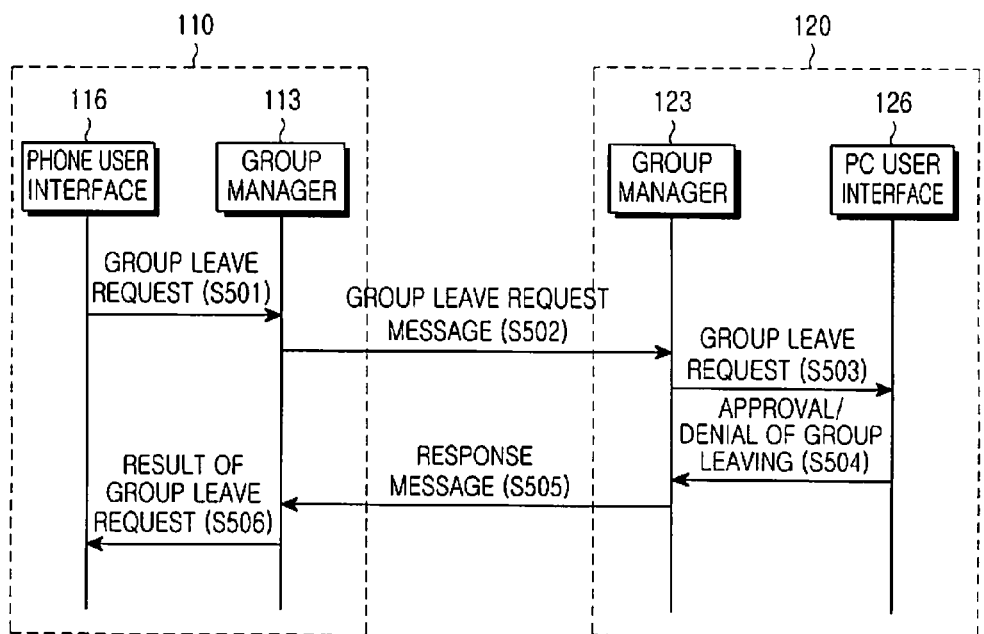
FIG. 5 is a flow diagram illustrating a group leaving of a mobile terminal in a presentation control method according to an embodiment of the present invention.

FIG. 5 illustrates leaving a group by a mobile terminal utilizing a presentation control method according to an embodiment of the present invention.

Referring to FIG. 5, upon receiving a group leave request from a user, a phone user interface 116 in a mobile terminal 110 sends a group leave request command to a group manager 113 in step S501. The group manager 113 generates a group leave request message including an identifier of the mobile terminal 110 and information indicating the group leave request, and sends the group leave request message to a group manager 123 in a PC 120 in step S502.

Upon receiving the group leave request message, the group manager 123 in the PC 120 checks the information indicating the group leave request, and provides the group leave request from the mobile terminal 110 to the PC user interface 126 in step S503. The PC user interface 126 receives an approval/denial of the group leaving from a user, and provides the received result to the group manager 123 in step S504. The group manager 123 updates group joining/leaving of the mobile terminal 110 based on the result provided from the PC user interface 126, and sends a response message with the approval/denial of the group leaving of the mobile terminal 110 to the group manager 113 in the mobile terminal 110 in step S505.

Upon receiving the response message, the group manager 113 provides a result of the group leave request, i.e., approval/denial of group leaving, to the phone user interface 116 in step S506. Thereafter, the phone user interface 116 provides the result of the group leave request to the user.

Alternatively, as described above, the group manager 123 may just approve the request for disconnection of the mobile terminal 110, without first receiving approval from the user of the PC 120, thereby skipping steps S503 and S504.

5. Opening of Presentation File

Figure 6:
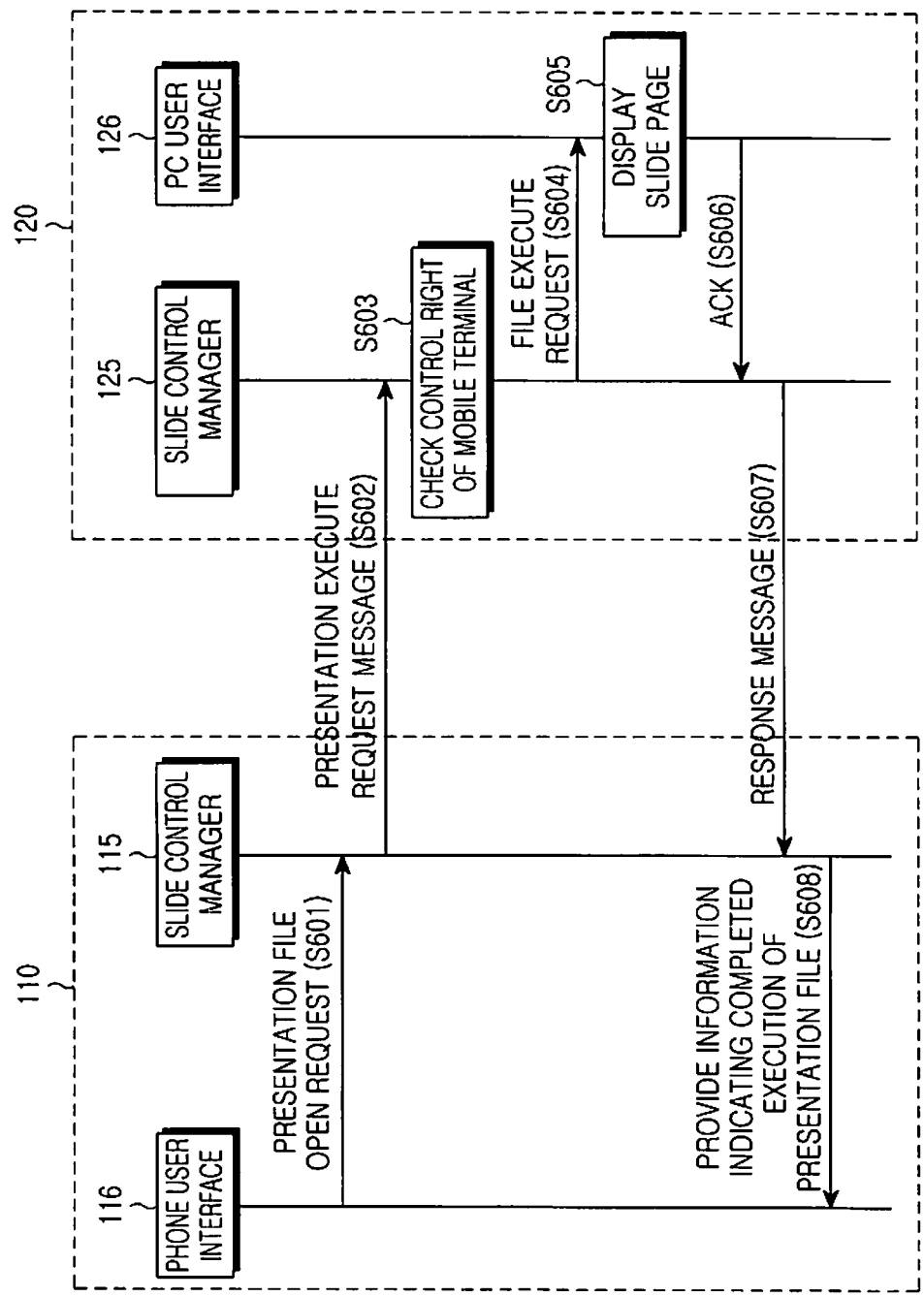
FIG. 6 is a flow diagram illustrating opening of a presentation file in a presentation control method according to an embodiment of the present invention.

FIG. 6 illustrates opening of a presentation file in a presentation control method according to an embodiment of the present invention.

Referring to FIG. 6, upon receiving an open request for a presentation file from a user, a phone user interface 116 in a mobile terminal 110 provides an open command for a presentation file to a slide control manager 115 in step S601. The slide control manager 115 generates a presentation execute request message including an identifier of the mobile terminal 110, information indicating the presentation file to be executed, and information requesting execution of the presentation file, and sends the presentation execute request message to a slide control manager 125 in the PC 120 in step S602.

Upon receiving the presentation execute request message, the slide control manager 125 checks a control right of the mobile terminal 110, which is stored in a group manager 123, in step S603. If the mobile terminal 110 has a control right, the slide control manager 125 sends a request to execute the presentation file to a PC user interface 126 in step S604. The PC user interface 126 determines whether the presentation file is present, and if the presentation file is present, the PC user interface 126 executes the presentation file and displays an initial slide page of the presentation in step S605.

The PC user interface 126 sends a response message or ACK with information indicating the completed execution of the presentation file to the slide control manager 125 in step S606. In step S607, the slide control manager 125 includes information indicating the completed execution of the presentation file in a response message to the presentation execute request message, and sends the response message to the slide control manager 115 in the mobile terminal 110.

Upon receiving the response message, the slide control manager 115 provides information indicating the completed execution of the presentation file to the phone user interface 116 in step S608, and the phone user interface 116 provides the information indicating the completed execution of the presentation file to the user.

However, if the mobile terminal 110 has no control right, the slide control manager 125 includes information indicating a denial of the presentation execute request in the response message and sends the response message to the slide control manager 115 in step S607, without proceeding with steps S604 to S606. Accordingly, in response to the response message, the slide control manager 115 provides the information indicating the denial of the presentation execute request to the phone user interface 116 in step S608, and the phone user interface 116 provides the denial of the presentation execute request to the user.

Also, if the presentation file is not present, the PC user interface 126 includes an error message in the response message or ACK being sent to the slide control manager 125 in step S606, without executing the presentation file in step S605.

In step S605, the PC user interface 126 determines whether the PC user interface 126 is currently executing the presentation file. If the PC user interface 126 is already executing the presentation file, the PC user interface 126 does not re-execute the presentation file. If the PC user interface 126 is not currently executing the presentation file, the PC user interface 126 executes the presentation file and displays an initial slide page to the screen of the PC 120.

If the PC user interface 126 does not execute the presentation file in step S605, in step S606, the PC user interface 126 includes an error message in the response message or ACK being sent to the slide control manager 125.

6. Closing of Presentation File

Figure 7:
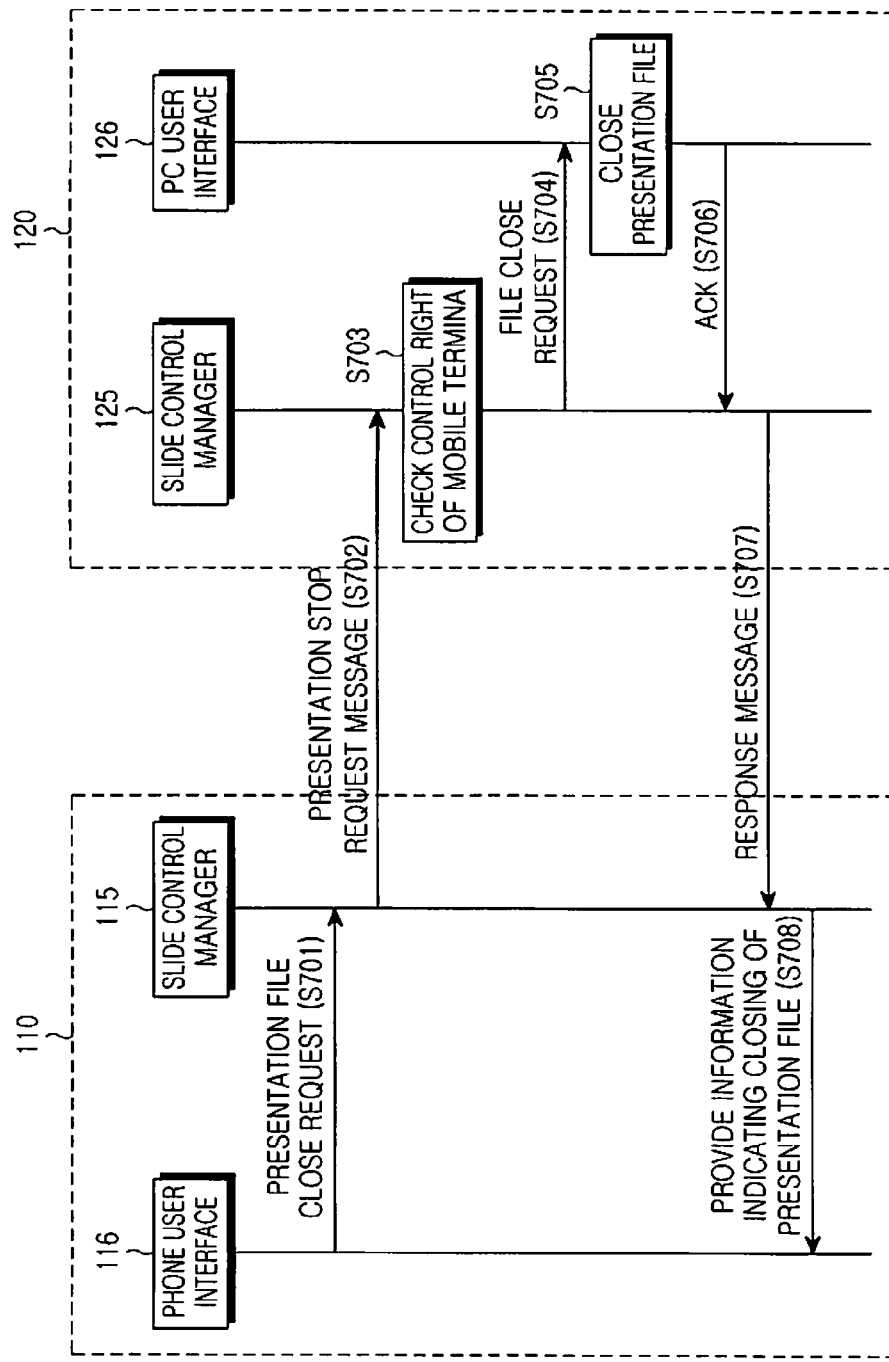
FIG. 7 is a flow diagram illustrating closing of a presentation file in a presentation control method according to an embodiment of the present invention.

FIG. 7 illustrates a process of closing a presentation file in a presentation control method according to an embodiment of the present invention.

Referring to FIG. 7, upon receiving a close request for a presentation file from the user, the phone user interface 116 in the mobile terminal 110 sends a close command for a presentation file to the slide control manager 115 in step S701. The slide control manager 115 generates a presentation stop request message including an identifier of the mobile terminal 110, information indicating a presentation file to be closed, i.e., information indicating a presentation file that is currently being executed, and information for requesting closing of the presentation file, and sends the presentation stop request message to the slide control manager 125 in the PC 120 in step S702.

In step S703, the slide control manager 125 checks a control right of the mobile terminal 110, which is stored in the group manager 123. If the mobile terminal 110 has a control right, the slide control manager 125 sends a close request for the presentation file to the PC user interface 126 in step S704. The PC user interface 126 determines if the presentation file is being executed, and if so, closes the presentation file in step S705. Subsequently, the PC user interface 126 sends a response message or ACK with information indicating the closing of the presentation file to the slide control manager 125 in step S706. The slide control manager 125 includes the information indicating the closing of the presentation file in a response message to the presentation stop request message, and sends the response message to the slide control manager 115 in the mobile terminal 110 in step S707.

Upon receiving the response message, the slide control manager 115 provides the information indicating the closing of the presentation file to the phone user interface 116 in step S708, and the phone user interface 116 provides the information indicating the closing of the presentation file to the user.

However, if the mobile terminal 110 has no control right, the slide control manager 125 sends the response message including information indicating a denial of the presentation stop request in step S707, without proceeding with steps S704 to S706. In response to the response message, the slide control manager 115 in the mobile terminal 110 provides the denial of the presentation stop request to the phone user interface 116 in step S708, and the phone user interface 116 provides the denial of the presentation stop request to the user.

Also, if there is no presentation file currently being executed in step S705, the PC user interface 126 includes an error message in the response message or ACK being sent to the slide control manager 125 in step S706.

In step S705, the PC user interface 126 determines if the presentation file is currently being executed, and the PC user interface 126 closes the presentation file only when the presentation file is being executed. Further, the PC user interface 126 includes an error message in the response message or ACK being sent to the slide control manager 125 in step S706 in when the presentation file is not currently being executed.

7. Switching of Slide Page

Figure 8:
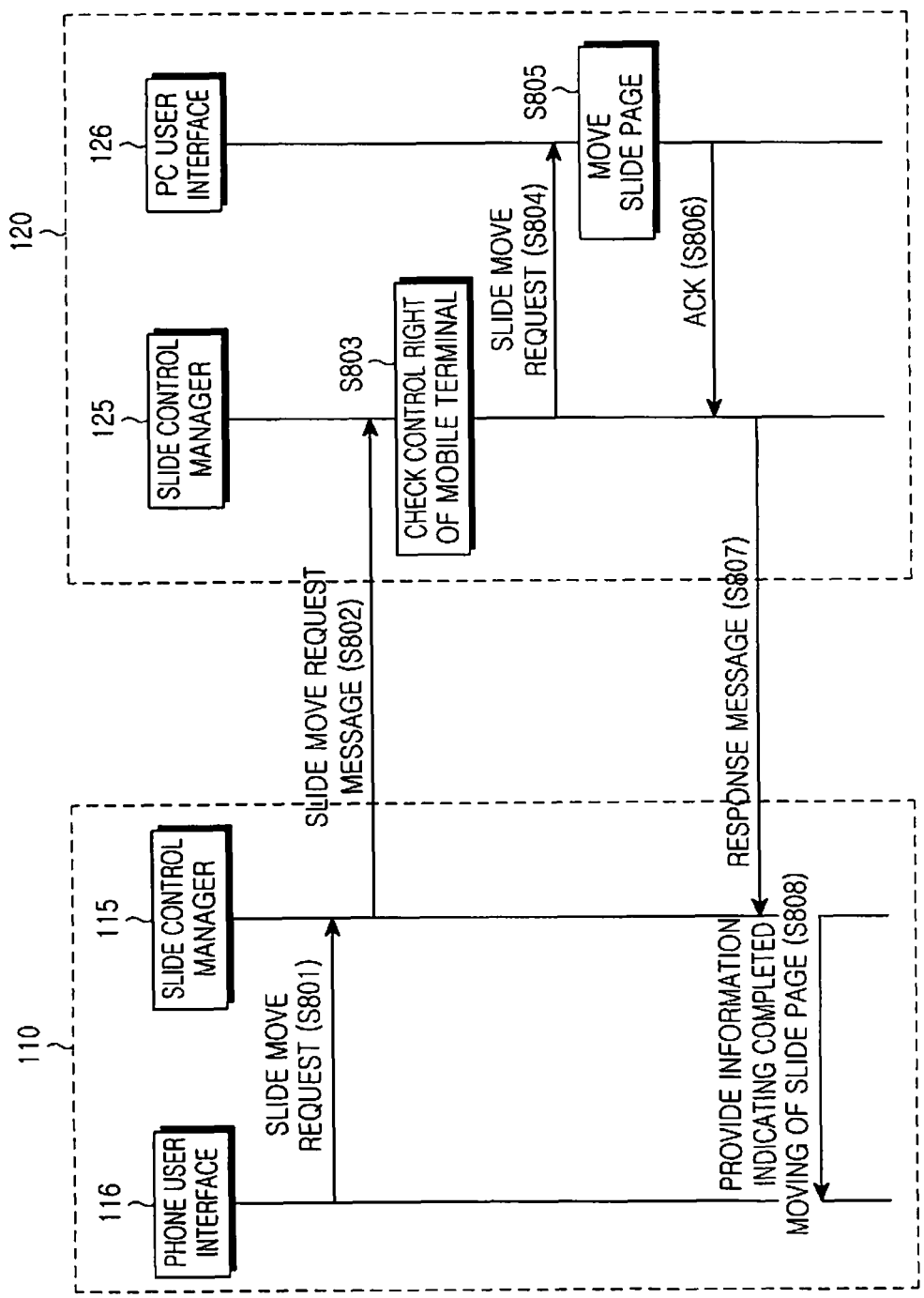
FIG. 8 is a flow diagram illustrating switching of a slide page in a presentation control method according to an embodiment of the present invention.

FIG. 8 illustrates a process of switching slide pages in a presentation control method according to an embodiment of the present invention.

Referring to FIG. 8, upon receiving a switch request for switching a currently displayed slide page included in a presentation file from the user, the phone user interface 116 in the mobile terminal 110 sends a switch command to the slide control manager 115 in step S801. For example, in step S801, the phone user interface 116 may receive a number of a slide page that the user desires to switch to, or may receive command to switch to a previous or next slide page from the current slide page through either of the motion sensor handler 117, the touch screen handler 118, or the button click handler 119. If the user moves the mobile terminal 110 in the right direction (or left direction), while the presentation file is being executed, the motion sensor handler 117 may detect the motion of the mobile terminal 110 by means of a motion sensor, and generate a command or request to switch the current slide page to the next or previous page. Similarly, if the user slides a finger over the touch screen in the right direction (or left direction), the touch screen handler 118 may detect the sliding direction and generate a command or request to switch the current slide page to the next or previous page. Additionally, if the user clicks a direction button, the button click handler 119 may generate a command or request to switch the current slide page to the next or previous page according to the direction button.

In step S802, the slide control manager 115 generates a slide switch request message including an identifier of the mobile terminal 110, an identifier of a presentation file with a target slide page to which the user desires to switch, information indicating the target slide page, and information for requesting switching of a slide page, and sends the slide switch request message to the slide control manager 125 in the PC 120.

In step 803, the slide control manager 125 checks a control right of the mobile terminal 110, which is stored in the group manager 123, in step S803. If the mobile terminal 110 has a control right, the slide control manager 125 sends a request to switch the slide page to the PC user interface 126 in step S804. The PC user interface 126 determines if the presentation file is being executed. If so, the PC user interface 126 determines if there is a switch-requested slide page in the presentation file, and if so, switches to the slide page and displays a new slide page in step S805.

The PC user interface 126 sends a response message or ACK with information indicating the completed switching of the slide page to the slide control manager 125 in step S806. The slide control manager 125 includes information indicating the completed switching of the slide page in a response message to the slide switch request message, and sends the response message to the slide control manager 115 in the mobile terminal 110 in step S807.

Upon receiving the response message, the slide control manager 115 provides the information indicating the completed switching of the slide page to the phone user interface 116 in step S808, and the phone user interface 116 provides the information indicating the completed switching of the slide page to the user.

However, if the mobile terminal 110 has no control right, the slide control manager 125 includes information indicating a denial of the slide switch request in the response message and sends the response message in step S807, without proceeding with steps S804 to S806. In response to the response message, the slide control manager 115 in the mobile terminal 110 provides the denial of the slide switch request to the phone user interface 116 in step S808, and the phone user interface 116 provides the denial of the slide switch request to the user.

Also, if there is no presentation file being executed in step S805, the PC user interface 126 includes an error message in the response message or ACK being sent to the slide control manager 125 in step S806.

If there is no switch-requested slide page, the PC user interface 126 does not perform switching of a slide page in step S805, and includes an error message in the response message or ACK being sent to the slide control manager 125 in step S806.

8. Uploading of Presentation File

Figure 9:
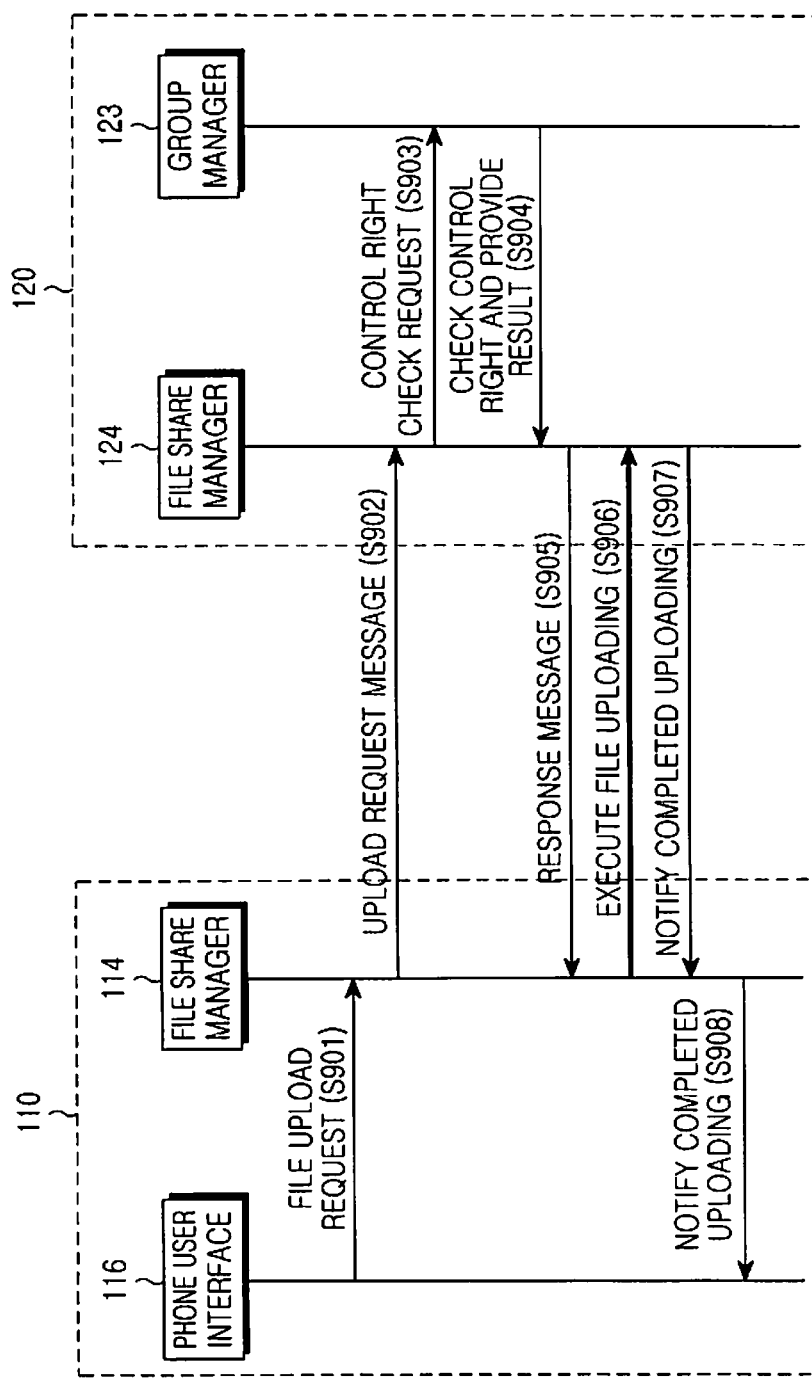
FIG. 9 is a flow diagram illustrating uploading of a presentation file in a presentation control method according to an embodiment of the present invention.

FIG. 9 illustrates a process of uploading a presentation file in a presentation control method according to an embodiment of the present invention.

Referring to FIG. 9, upon receiving an upload request for a presentation file from the user, the phone user interface 116 in the mobile terminal 110 sends an upload request for a presentation file to the file share manager 114 in step S901. For example, in step S901, the phone user interface 116 may provide the user with a list of presentation files stored in the mobile terminal 110 so that the user may select one presentation file included in the list.

In step S902, the file share manager 114 generates an upload request message including an identifier of the mobile terminal 110, an identifier of a presentation file to be uploaded, and information for requesting uploading of a presentation file, and sends the upload request message to the file share manager 124 in the PC 120.

In step S903, the file share manager 124 requests the group manager 123 to check a control right of the mobile terminal 110. In response, the group manager 123 checks a control right of the mobile terminal 110, and provides the acquired control right check information to the file share manager 124 in step S904.

Upon receiving the control right check information indicating that the mobile terminal 110 has a control right, the file share manager 124 sends a response message with information indicating that the mobile terminal 110 has a control right, to the file share manager 114 in the mobile terminal 110 in step S905. Then the file share manager 114 uploads a presentation file stored in the mobile terminal 110 to the file share manager 124 in the PC 120 in step S906.

Once the uploading of the presentation file is completed, the file share manager 124 sends a message indicating the completed uploading to the file share manager 114 in the mobile terminal 110 in step S907. The file share manager 114 notifies the phone user interface 116 of the completed uploading in step S908.

However, if the mobile terminal 110 has no control right, the file share manager 124 sends a response message with information indicating that the mobile terminal 110 has no control right, to the file share manager 114 in the mobile terminal 110 in step S905, thereby skipping steps S906 and S907 for file uploading.

9. Downloading of Presentation File

Figure 10:
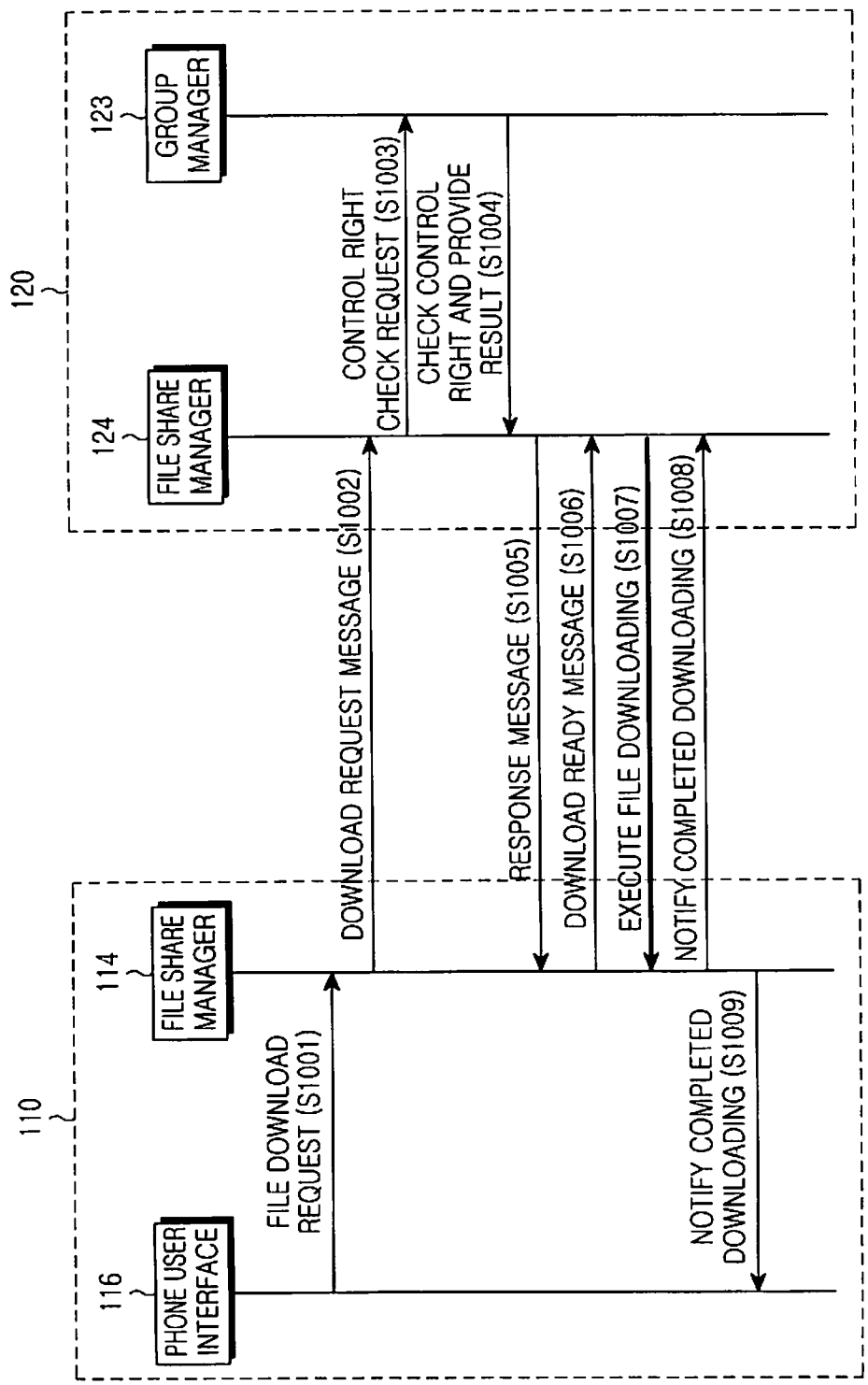
FIG. 10 is a flow diagram illustrating downloading of a presentation file in a presentation control method according to an embodiment of the present invention.

FIG. 10 illustrates a process of downloading a presentation file in a presentation control method according to an embodiment of the present invention.

Referring to FIG. 10, upon receiving a download request for a presentation file from the user, the phone user interface 116 in the mobile terminal 110 sends a download request for a presentation file to the file share manager 114 in step S1001. For example, in step S1001, the mobile terminal 110 may previously store a list of presentation files stored in the PC 120, and provide the list to the user on the phone user interface 116 so that the user may select a presentation file from the list. Alternatively, when the mobile terminal 110 is currently executing a presentation file, the mobile terminal 110 may request to download the presentation file currently being executed, without letting the user select a separate presentation file.

In step S1002, the file share manager 114 generates a download request message including an identifier of the mobile terminal 110 and information for requesting downloading of a presentation file, and sends the download request message to the file share manager 124 in the PC 120. If a presentation file to be downloaded is selected by the user on the phone user interface 116, the file share manager 114 may include an identifier of the selected presentation file in the download request message. Alternatively, the file share manager 114 may include an identifier for requesting to download the presentation file currently being executed, in the download request message.

In step S1003, the file share manager 124 requests the group manager 123 to check a control right of the mobile terminal 110. In step S1004, the group manager 123 checks a control right of the mobile terminal 110, and provides the acquired control right check information to the file share manager 124.

Upon receiving the control right check information indicating that the mobile terminal 110 has a control right, the file share manager 124 sends a response message with information indicating that the mobile terminal 110 has a control right, to the file share manager 114 in the mobile terminal 110 in step S1005. The file share manager 114 sends a download ready message including information indicating its ready to download a presentation file, to the file share manager 124 in the PC 120 in step S1006.

Upon receiving the download ready message, the file share manager 124 executes downloading of the presentation file requested by the mobile terminal 110 in step S1007. When the downloading of the presentation file is completed, the file share manager 114 sends a message notifying the completed downloading to the file share manager 124 in the PC 120 in step S1008. The file share manager 114 notifies the phone user interface 116 of the completed downloading of the presentation file in step S1009.

However, if the mobile terminal 110 has no control right, the file share manager 124 sends a response message with information indicating that the mobile terminal 110 has no control right, to the file share manager 114 in the mobile terminal 110 in step S1005, without performing steps S1006 to S1008.

According to the embodiments of the present invention described above, for example, a businessperson, who often conducts presentations using slide software such as Power-Point and Keynote and travels to different places to conduct these presentations, may carry his mobile terminal in which presentation files are saved, and when necessary, may access a PC at one of the presentation sites, upload presentation data to the PC, and execute a slideshow using the mobile terminal.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for controlling presentation slides, comprising:
    connecting at least one first terminal to a second terminal;
    sending, by the first terminal, an upload request for a presentation file to the second terminal;
    receiving, by the first terminal, from the second terminal, control right check information obtained by checking a control right of the first terminal;
    uploading, by the first terminal, the presentation file to the second terminal; and
    receiving, by the first terminal, from the second terminal, an upload complete message indicating completed uploading of the presentation file;
    controlling, by the first terminal, execution of the presentation file in the second terminal;
    controlling, by the first terminal, the second terminal to switch from a current slide page of the presentation file to another slide page included in the presentation file; and
    closing, by the first terminal, the presentation file in the second terminal.

2. The method of claim 1, wherein the connecting comprises:
    sending, by the first terminal, a connect request message to the second terminal; and
    receiving a response message from the second terminal in response to the connect request message.

3. The method of claim 1, wherein the controlling the execution of the presentation file comprises:
    sending, by the first terminal to the second terminal, a presentation execute request message including identification information of the first terminal, information indicating the presentation file to be executed, and information indicating that the presentation file is to be opened; and
    receiving, by the first terminal, a response message from the second terminal, in response to the presentation execute request message.

4. The method of claim 3, further comprising:
    transmitting, by the first terminal, a group join request message including information requesting a group joining and a right type to the second terminal;
    receiving, by the first terminal, a response message including an approval/denial of group joining of the first terminal, input through a user interface.

5. The method of claim 4, wherein controlling the second terminal to switch from the current slide page of the presentation file to the another slide page included in the presentation file comprises:
    sending, by the first terminal, to the second terminal, a slide switch request message including identification information of the first terminal, information indicating the presentation file, and information indicating switching of the current slide page of the presentation file to the another slide page included in the presentation file; and
    receiving, by the first terminal, a response message from the second terminal, in response to the slide switch request message.

6. The method of claim 5, wherein the response message further comprises information indicating execution/non-execution of switching the slide page based on the right type of the first terminal and the determined movability of the slide page.

7. The method of claim 1, wherein closing of the presentation file comprises:
    sending, by the first terminal to the second terminal, a presentation stop request message including identification information of the first terminal, information indicating the presentation file to be closed, and information indicating closing of the presentation file; and
    receiving, by the first terminal, a response message from the second terminal, in response to the presentation stop request message.

8. The method of claim 1, further comprising:
    sending, by the first terminal to the second terminal, a group join request message for requesting joining in a connection group of the second terminal; and
    receiving a response message with information indicating an approval/denial of group joining from the second terminal, in response to the group join request message.

9. The method of claim 1, further comprising:
sending, by the first terminal, a download request for the presentation file to the second terminal;
receiving, from the second terminal, control right check information obtained by checking a control right of the first terminal;
downloading the presentation file from the second terminal; and
sending, by the first terminal to the second terminal, a download complete message indicating completed downloading of the presentation file.

10. A device for controlling presentation slides through another device that is wirelessly connected to the device, the device comprising:
a memory for storing a software block including a program instruction; and
a controller for implementing the program instruction,
wherein the software block comprises:
a phone agent including the program instruction for managing a connection with the another device, managing sharing of a presentation file with the another device, and managing opening and closing of the presentation file stored in the another device, and switching between slide pages included in the presentation file;
a user interface for delivering a user input to the phone agent; and
a file share manager including the program instruction for requesting sharing of the presentation file, and handling transmission and reception of the presentation file by sending an upload request for the presentation file to the another device, receiving control right check information obtained by checking a control right of the device, uploading the presentation file to the another device and receiving an upload complete message indicating completed uploading of the presentation file.

11. The device of claim 10, wherein the phone agent comprises:
a connection manager including the program instruction for searching for the another device, providing a search result to the user interface, and managing connection starting, connection holding, and connection terminating with the another device; and
a slide control manager including the program instruction for generating a command to control opening and closing of the presentation file and switching of the slide pages.

12. The device of claim 10, wherein the phone agent further comprises a group manager including the program instruction for requesting a control right of the presentation file stored in the another device.

* * * * *